Jan. 27, 1959

H. E. WELLS ET AL 2,870,791

PRESSURE ACCUMULATOR

Filed Oct. 3, 1955

INVENTORS:
HAROLD E. WELLS and
JOHN F. STRICKLER, JR.
BY

Bean, Brooks, Buckley & Bean
ATTORNEYS.

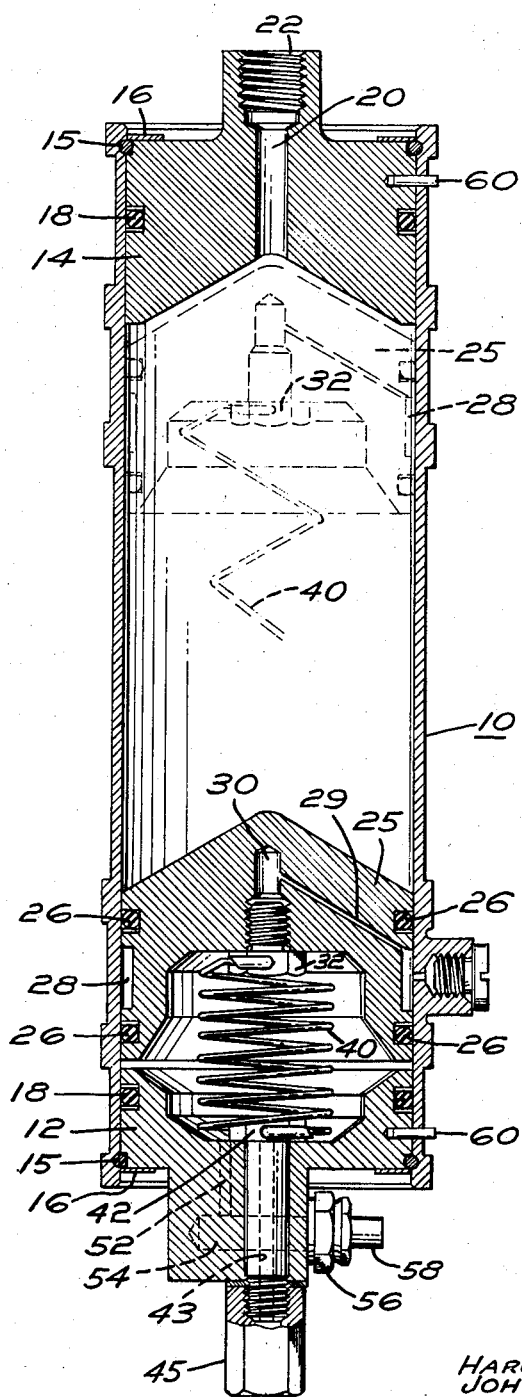

United States Patent Office

2,870,791
Patented Jan. 27, 1959

2,870,791

PRESSURE ACCUMULATOR

Harold E. Wells, Kenmore, and John F. Strickler, Jr., Williamsville, N. Y., assignors to Bell Aircraft Corporation, Wheatfield, N. Y.

Application October 3, 1955, Serial No. 537,962

3 Claims. (Cl. 138—31)

This invention relates to improvements in pressure accumulators, and more particularly to improvements in cylinder-piston type accumulators such as are often used in hydraulic systems of aircraft for absorbing hydraulic shock and/or for accumulating reserves of hydraulic fluid, so that the pressures in the system are maintained within predetermined pressure limits.

Whereas it is known that numerous cylinder-piston type pressure accumulators are currently available, for example as made in accord with U. S. Patents No. 2,440,065 and No. 2,683,467; the present invention provides an improved hydraulic accumulator design incorporating an improved seal whereby to improve the functioning of such units. More specifically, the present invention provides an improvement in piston type accumulators as aforesaid such as employ O ring seals.

The present invention contemplates venting of the low pressure side of an O ring cavity to the atmosphere externally of the accumulator cylinder, whereby the resulting differential in pressure across the O rings forces the rings toward the low pressure sides of their grooves and deforms them to provide an improved sealing effect, compared to prior accumulator designs. The aforesaid venting is obtained by connecting a flexible conduit at one end in communication with the O ring groove or cavity of the piston, and at its other end to a vent through the cylinder end wall, thereby avoiding interferences with travel of the piston in the cylinder. Furthermore, to insure maintenance of the piston in proper angular alignment with the cylinder during operation of the device, the piston head and the opposed cylinder end are complementarily cam-shaped.

In the drawing herewith:

Fig. 3 is a longitudinal sectional view thereof, on slightly enlarged scale;

Figure 1:
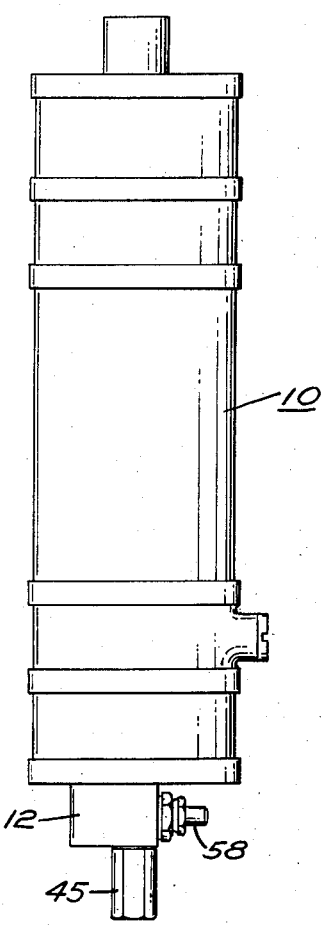
Fig. 1 is an elevational view of a pressure accumulator embodying the invention.
Figure 2:
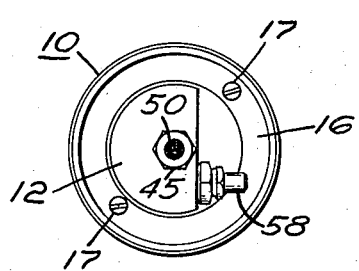
Fig. 2 is an end view thereof.

An exemplary form of the invention is illustrated in the drawing herewith as being embodied in a pressure accumulator comprising generally a cylinder 10 provided with end closure plugs 12 and 14. The closure plugs may of course be of any suitable form but are illustrated herein as being retained in the cylinder by means of snap rings 15—15 fitting into complementary shaped grooves in the cylinder bore. Retaining plates as indicated at 16—16 are detachably fixed as by means of screws 17—17 to the closure plugs for holding the plates against the snap rings upon final assembly of the device, thereby positioning the closure plugs against motion in either direction relative to the cylinder. Pressure seal devices such as rubber O rings as indicated at 18—18 are furnished to pressure-seal the closure plugs relative to the cylinder.

The closure 14 is provided with a port 20 leading to a threaded connection 22 for coupling with the hydraulic conduit system to be controlled by the device, whereby the system is in fluid-pressure communication with the interior of the cylinder 10. Slidably mounted in the cylinder is a piston as indicated at 25; the piston 25 being arranged to be pressure-sealed relative to the cylinder 10 by means of a pair of O rings 26—26, residing in grooves formed in the peripheral side wall of the piston. However, it is a particular feature of the present invention that a pressure release groove or cavity as indicated at 28 is also formed in the peripheral wall of the piston 25 intermediately of the positions of the O rings 26—26, and is arranged to be vented to the atmosphere exteriorly of the cylinder.

Figure 5:
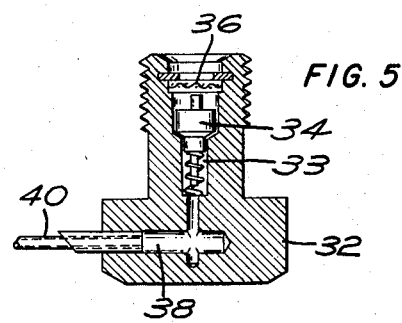
Fig. 5 is a sectional view, on a similarly enlarged scale, of another disassembled component part of the device.
Figure 6:
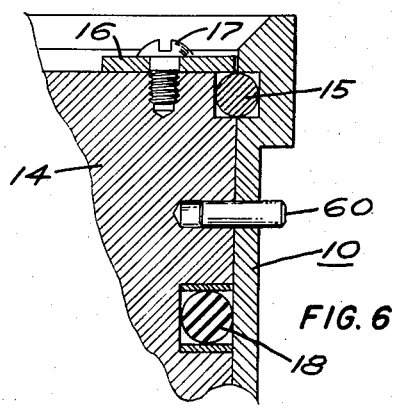
Fig. 6 is a fragmentary enlarged scale sectional view of the detail of Fig. 3.

For this latter purpose the vent channel 28 is connected by means of a passageway 29 to a central bore 30 formed in the piston. A cap screw 32 is screwed into the bore 30, and as shown in better detail in Fig. 5 the cap screw 32 is longitudinally bored and counterbored as indicated at 33 to accommodate therein a check valve 34. A filter screen as indicated at 36 is preferably carried within the bore of the nut 32, and the latter is laterally bored as indicated at 38 to provide an outlet passageway into which is slip-fitted one end of a flexible helically coiled tubing 40. At its other end, the tube 40 slip-fits into the laterally bored head portion of a cap screw 42, which is also longitudinally bored as indicated at 43 thereby making provision for venting of pressure from the piston chamber 28 into the bore 43 of the screw 42.

Figure 4:
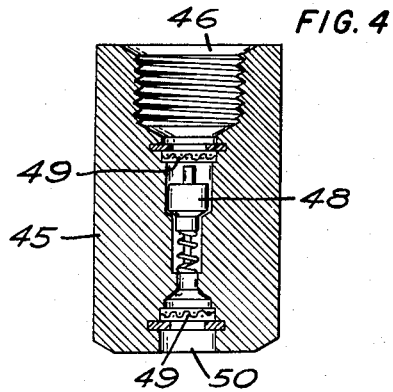
Fig. 4 is a sectional view on an enlarged scale of a disassembled component part of the device.

As shown in better detail in Fig. 4, a threaded cap 45 is mounted on the outer end of the screw 42 and is longitudinally bored to accommodate therewithin a check valve 48 and a pair of filter screens 49—49; the cap piece 45 being open at its outer end as indicated at 50 so as to vent the pressure from the piston chamber 28 to the atmosphere exteriorly of the entire device.

The end closure 12 is longitudinally bored as indicated at 52 and laterally bored as indicated at 54 (Fig. 3) and then fitted with a connection nipple as indicated at 56 for coupling with a compressed air supply conduit as indicated at 58, whereby the cylinder may be charged with compressed air or the like behind the piston 25; thereby exerting pressure against the oil contained within the cylinder ahead of the piston. Thus, it will be understood that the device is adapted to be mounted in any convenient location and connected into a hydraulic system and to a compressed air or gas supply system, whereupon it will be ready to operate to maintain a substantially uniform pressure condition within the hydraulic system.

As stated hereinabove, it is a particular feature of the present invention that the method of sealing the piston relative to the cylinder provides superior results. This is because of the fact that the piston area between the O rings 26, 26 is constantly vented to the external atmosphere, whereby the pressure forces existing at opposite ends of the piston are enabled to pressure the O rings against their channel walls nearest to the vent passageway 28. This action crams the O rings into effective pressure sealing relation, as distinguished from permitting them to "relax" intermediately of their carrying channels such as would occur in event the pressure forces at opposite sides of the O rings were equalized. Because of the flexible helical construction of the tubing 40, the latter permits free motion of the piston 25 as between the solid line and broken line positions thereof shown in Fig. 3, while still venting the pressure between O rings to the atmosphere as explained hereinabove.

The end closure plugs 12, 14 are positioned against rotational movements within the cylinder 10 by means of pins 60. In order to prevent the piston 25 from rotating within the cylinder to such a degree as to fracture the tubing 40, any suitable means may be employed. For example, as shown in Fig. 3 of the drawing herewith, an effective means for this purpose may be provided by shaping the opposed end faces of the piston 25 and the end closure 14 to be of some complementary interfitting form, such as V-shaped as shown in the drawing. Thus, each time the piston strokes within the cylinder and abuts the end closure 14, the wedge-shaped configurations thereof cause the piston 25 to be cammed back into proper alignment, in event the piston had previously started to rotate into disalignment from its original attitude in the cylinder.

What is claimed is:

1. A pressure accumulator comprising a cylinder having a gas inlet port at one end and a liquid port at the other end and a piston slidably mounted in said cylinder intermediately of said ports thereby defining separate gas and liquid chambers interiorly of said cylinder, said piston havnig a pair of spaced annular grooves in the peripheral wall thereof and an annular chamber in the peripheral wall thereof intermediately of said grooves, a resilient deformable O ring in each of said grooves bearing against the inner wall of said cylinder, a fluid passageway in open communication with said annular chamber and communicating with one end of a helically coiled tube connected to said piston, the other end of said tube being connected to a passageway formed through one end of said cylinder whereby to intercommunicate said annular chamber between said O ring grooves with the atmosphere exteriorly of said cylinder while enabling sliding movement of said piston in said cylinder.

2. A pressure accumulator comprising a cylinder having a gas inlet port and a liquid port and a piston slidably mounted in said cylinder intermediately of said ports thereby defining separate gas and liquid chambers interiorly of said cylinder, said piston having spaced annular grooves in the peripheral wall thereof interconnected by an additional chamber disposed intermediately of said grooves, a resilient deformable seal ring in each of said grooves bearing against the inner wall of said cylinder, a helically coiled tube connected at one end to said piston in communication with said additional chamber and at its other end to a vent passageway formed through said cylinder whereby to intercommunicate said additional chamber with the atmosphere exteriorly of said cylinder while enabling sliding movement of said piston in said cylinder.

3. A pressure accumulator comprising a cylinder having a gas inlet port and a liquid port and a piston slidably mounted in said cylinder intermediately of said ports thereby defining separate gas and liquid chambers interiorly of said cylinder, said piston having a pair of spaced annular grooves in the peripheral wall thereof and an annular chamber in the peripheral wall thereof intermediately of said grooves, a resilient deformable seal ring in each of said grooves bearing against the inner wall of said cylinder, a fluid passageway in open communication with said annular chamber and communicating with one end of a flexible tube connected to said piston, the other end of said tube being connected to a passageway formed through one end of said cylinder whereby to intercommunicate said annular chamber with the atmosphere exteriorly of said cylinder while enabling sliding movement of said piston in said cylinder.

References Cited in the file of this patent

UNITED STATES PATENTS

| | | |
|---|---|---|
| 2,417,256 | Kremiller | Mar. 11, 1947 |
| 2,440,065 | Ashton | Apr. 20, 1948 |
| 2,683,467 | Greer | July 13, 1954 |
| 2,715,419 | Ford et al. | Aug. 16, 1955 |
| 2,790,462 | Ashton | Apr. 30, 1957 |